(12) United States Patent
Ranganath et al.

(10) Patent No.: US 12,198,489 B2
(45) Date of Patent: Jan. 14, 2025

(54) INFORMATION PROCESSING APPARATUS, INFORMATION PROCESSING METHOD, AND STORAGE MEDIUM

(71) Applicant: NEC Corporation, Tokyo (JP)

(72) Inventors: Kris Ranganath, Sacramento, CA (US); Kannan Veeranan Gandhi, Sacramento, CA (US); Arun Chandrasekaran, Sacramento, CA (US); Rody Bagtes, Sacramento, CA (US)

(73) Assignee: NEC CORPORATION, Tokyo (JP)

( * ) Notice: Subject to any disclaimer, the term of this patent is extended or adjusted under 35 U.S.C. 154(b) by 93 days.

(21) Appl. No.: 17/763,302

(22) PCT Filed: Oct. 2, 2020

(86) PCT No.: PCT/JP2020/037555
§ 371 (c)(1),
(2) Date: Mar. 24, 2022

(87) PCT Pub. No.: WO2021/066148
PCT Pub. Date: Apr. 8, 2021

(65) Prior Publication Data
US 2022/0335766 A1 Oct. 20, 2022

Related U.S. Application Data

(60) Provisional application No. 62/910,751, filed on Oct. 4, 2019.

(51) Int. Cl.
*G07C 9/37* (2020.01)
*G06V 40/16* (2022.01)
(Continued)

(52) U.S. Cl.
CPC ............. *G07C 9/37* (2020.01); *G06V 40/169* (2022.01); *G06V 40/23* (2022.01); *G07C 9/10* (2020.01)

(58) Field of Classification Search
CPC .......... G07C 9/37; G07C 9/10; G06V 40/169; G06V 40/23
See application file for complete search history.

(56) References Cited

U.S. PATENT DOCUMENTS

| 11,328,513 | B1 * | 5/2022 | Osherovich | .......... G06V 10/751 |
| 2008/0024643 | A1 * | 1/2008 | Kato | .................... G06V 40/166 |
| | | | | 348/333.12 |

(Continued)

FOREIGN PATENT DOCUMENTS

| CN | 108230518 A | 6/2018 |
| JP | 2007-303239 A | 11/2007 |

(Continued)

OTHER PUBLICATIONS

Extended European Search Report for EP Application No. 20871692.8, dated on Oct. 24, 2022.

(Continued)

*Primary Examiner* — Nabil H Syed

(57) ABSTRACT

An apparatus includes a memory storing one or more instructions; and a processor configured to execute the one or more instructions to: obtain a first image including one or more faces captured at a first time by one or more cameras, each of the one or more faces corresponding to a person, among one or more persons; detect a first person, among the one or more persons, by performing facial recognition operation on the one or more faces in the image obtained from the camera; detect a body region corresponding to a face region of the first person; track the body region in a second image captured by the one or more cameras at a second time subsequent to the first time; and output infor- (Continued)

mation to control a bather to open based on a determination that the body region is approaching the barrier.

13 Claims, 10 Drawing Sheets

(51) Int. Cl.
*G06V 40/20* (2022.01)
*G07C 9/10* (2020.01)

(56) References Cited

U.S. PATENT DOCUMENTS

| | | | |
|---|---|---|---|
| 2016/0063315 | A1 | 3/2016 | Lim et al. |
| 2017/0011265 | A1* | 1/2017 | Shaw ..................... G06V 20/52 |
| 2018/0350174 | A1 | 12/2018 | Landers, Jr. et al. |
| 2019/0313009 | A1* | 10/2019 | Alameh ............... G06V 40/166 |
| 2020/0202110 | A1 | 6/2020 | Kochi et al. |
| 2021/0110625 | A1* | 4/2021 | Kawase .................. G07C 9/25 |

FOREIGN PATENT DOCUMENTS

| | | | | |
|---|---|---|---|---|
| JP | 2015001790 | A | * | 1/2015 |
| JP | 6409929 | B | | 10/2018 |

OTHER PUBLICATIONS

International Search Report for PCT Application No. PCT/JP2020/037555, mailed on Nov. 17, 2020.
SG Office Action for SG Application No. 11202203279Q, mailed on Apr. 26, 2024.

\* cited by examiner

INFORMATION PROCESSING APPARATUS, INFORMATION PROCESSING METHOD, AND STORAGE MEDIUM

This application is a National Stage Entry of PCT/JP2020/037555 filed on Oct. 2, 2020, which claims priority from U.S. Provisional Application 62/910,751 filed on Oct. 4, 2019, the contents of all of which are incorporated herein by reference, in their entirety.

TECHNICAL FIELD

The disclosure relates to an information processing apparatus, an information processing method, and a storage medium. More particularly, it relates to an information processing apparatus, an information processing method, and a storage medium for performing authentication of people using an image captured by a camera.

BACKGROUND ART

Recently, a gate apparatus has been provided in facilities, such as airports, for controlling a passageway through which a user may walk, such as a security screening area. In the related art gate apparatus, a face authentication operation may be performed by comparing a face image acquired from a camera with a face image acquired from a registered image, such as a passport. However, in the related art gate apparatus, it is necessary for the staff of the facility to operate a camera to capture the face image of a passenger or a visitor for performing the face authentication operation. This manner of performing face authentication results in a delay as each passenger or a visitor is required to stop at the camera one by one. Therefore, it is difficult for the passenger or the visitor to pass through the gate apparatus quickly.

SUMMARY

In view of the problem described above, one or more aspects of the disclosure provide a gate apparatus, a control method of the gate apparatus, and a storage medium for allowing a user, such as passenger or a visitor, to pass through a gate apparatus without having to stop in front of the camera, thus reducing delays for the user.

According to an aspect of the disclosure, there is provide an apparatus comprising: a memory storing one or more instructions; and a processor configured to execute the one or more instructions to: obtain a first image including one or more faces captured at a first time by one or more cameras, each of the one or more faces corresponding to a person, among one or more persons; detect a first person, among the one or more persons, by performing facial recognition operation on the one or more faces in the image obtained from the camera; detect a body region corresponding to a face region of the first person; track the body region in a second image captured by the one or more cameras at a second time subsequent to the first time; and output information to control a barrier to open based on a determination the body region is approaching the barrier.

According to another aspect of the disclosure, there is provided an apparatus comprising: a memory storing one or more instructions; and a processor configured to execute the one or more instructions to: obtain a first image including a plurality of faces captured at a first time by one or more cameras, the plurality of faces corresponding, respectively, to a plurality of people; detect a first person, among the plurality of people, by performing a facial recognition operation on the plurality of faces in the first image; detect a body region corresponding to a face region of the first person; track the body region in a second image captured by the one or more cameras at a second time subsequent to the first time; and output information to control a barrier to open based on a determination the body region is approaching the barrier.

According to another aspect of the disclosure, there is provided an apparatus comprising: a memory storing one or more instructions; and processor configured to execute the one or more instructions to: obtain an image captured by a camera, the image including a plurality of faces corresponding respectively to a plurality of people approaching a barrier, each of the plurality of faces comprising a feature; detect a first person as a person closest to the camera among the plurality of people, based on a size of the feature for the first person; and output information to control the barrier based on a result of comparing information of the face of the first person from the obtained image with a plurality of registered information, each of the plurality of registered identification information corresponding to a person registered prior to obtaining the image.

DESCRIPTION OF EXAMPLE EMBODIMENTS

Figure 1A:
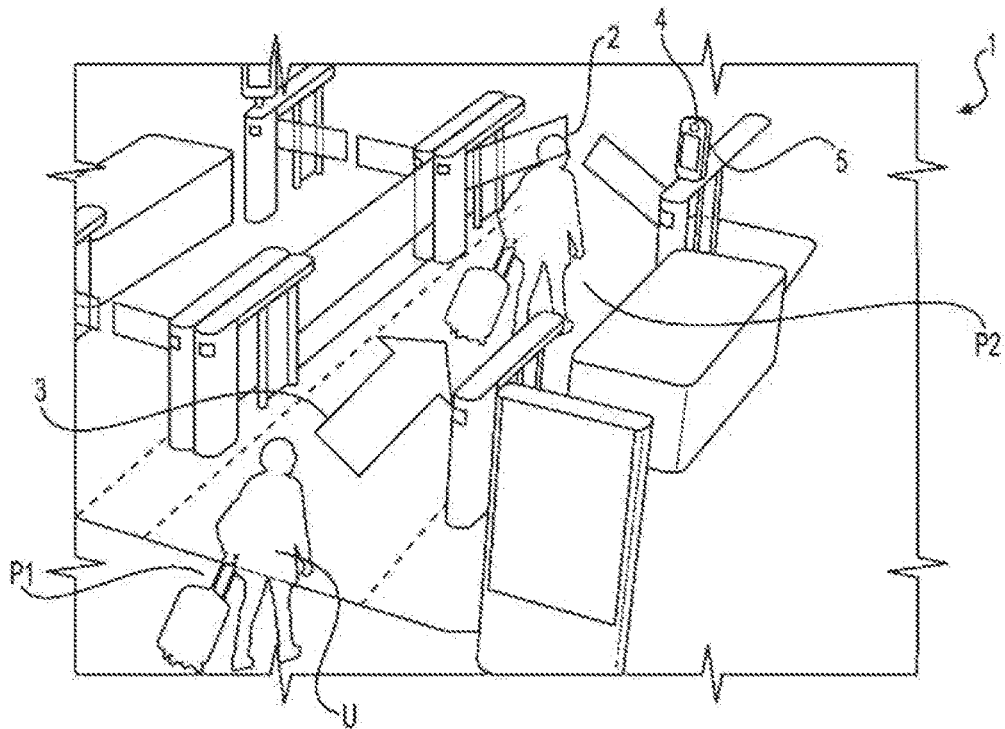
FIG. 1A illustrates an example of a gate apparatus according to an embodiment.

One or more example embodiments of the disclosure will be described below with reference to the drawings. Throughout the drawings, the same components or corresponding components are labeled with the same reference numerals, and, accordingly, the description thereof may be omitted or simplified.

Figure 1B:
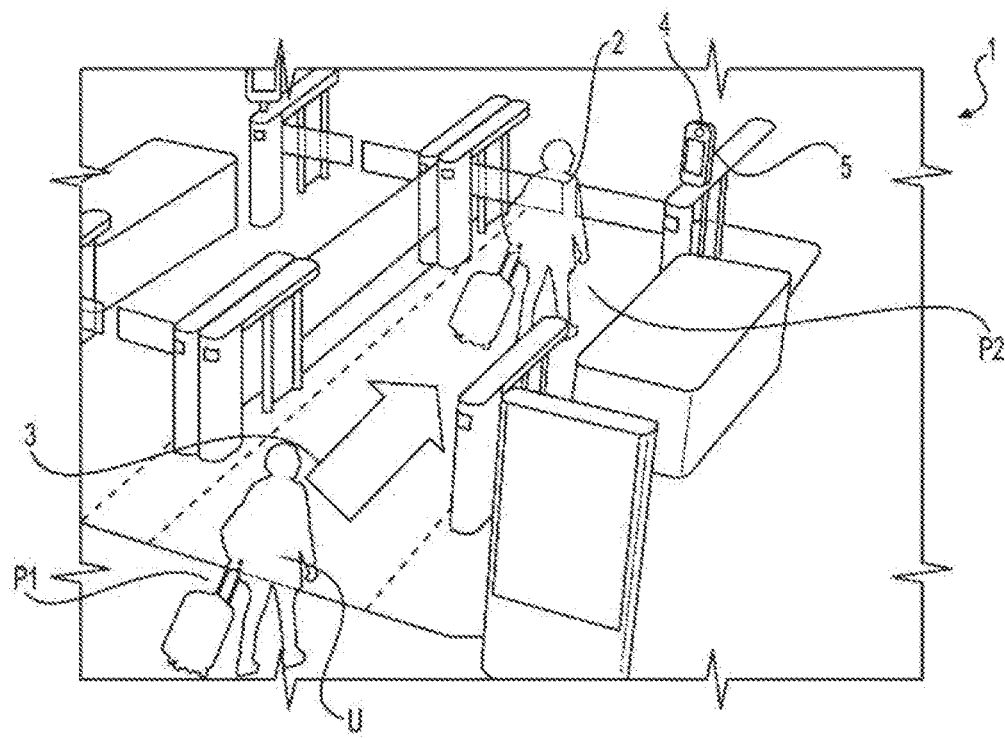
FIG. 1B illustrates an example of a gate apparatus according to an embodiment.

FIGS. 1A and 1B illustrate an example of a gate apparatus 1 according to a non-limiting example embodiment. As illustrated in FIG. 1A, the gate apparatus 1 may include a gate 2 provided in a passage way 3 for controlling traffic through the passage way 3. The gate apparatus 1 may further include a camera 4 and information processing apparatus 5 for performing facial recognition of users walking through the passage way 3. According to an embodiment, the information processing apparatus 5 may obtain a first image of a person, or a user (U), at a first position P1, while the person approaches the gate 2. The first image may be captured at a first time (t1) by the camera 4. The first image may include one or more faces of people near the gate apparatus, each of the one or more faces corresponding to a user, among a plurality of users.

According to an embodiment, the information processing device 5 may be configured to detect a first user, among a plurality of users, by performing a facial recognition operation on the faces in the first image. For instance, the facial recognition operation may be part of an authentication operation performed in whole or in part by the information processing device 5, which is configured to authenticate the face of the user as a person authorized to pass through the gate, referred to as an authenticated user (U).

According to an embodiment, the information processing device 5 may detect a region of the authenticated user's (U), as a body region. This body region can be associated with the face region of the authenticated user (U). By associating the authenticated user's (U) body region with the corresponding face region, the authenticated user (U) can by tracked by tracking the body region. When the user is at a second position P2 in the passage way, a second image can be acquired by the camera 4. The second image may be captured at a second time (t2) subsequent to the first time (t1), and may be captured by the same camera 4 or by an image capturing device that is different from camera 4, which captured the first image. The second image may contain the body region, but may not contain the face region of the authenticated user (U). This might be because of the authenticated user's (U) movement between time t1 and time t2, or it might be because the authenticated user's (U) face is not sufficiently facing the camera 4 at time t2, the face is obscured in the second image, or is not present in the second image at time t2. Since the body part region is associated with the authenticated user (U), the authenticated user (U) can be tracked in the second image even though the face region might not be present in the second image. The information processing device 5 may output information to control the gate 2 to be opened based on a determination the tracked body region is approaching the barrier. In this manner, it is not necessary for the information processing device 5 to repeatedly authenticate the user after the user has been authenticated as an authorized person. For instance, since the body region of the authenticated user is being tracked, the gate 2 may be opened even when the person in not facing the camera 4 at position P2.

In FIG. 1B, the information processing device 5 can be configured to prevent the gate 1 from opening when the information processing device 5 determines that the body region tracked in the second image at position P2 is not associated with a face region of a user authenticated in the first image. For instance, when the information processing device 5 is unable to perform facial recognition operation on a face in the first image obtained from the camera 4, the information processing device 5 may not track the body region corresponding to the face in the first image. Therefore, the information processing device 5 does not open the gate 1 unless an additional facial recognition operation for the user is performed and the user authenticated.

Figure 2:
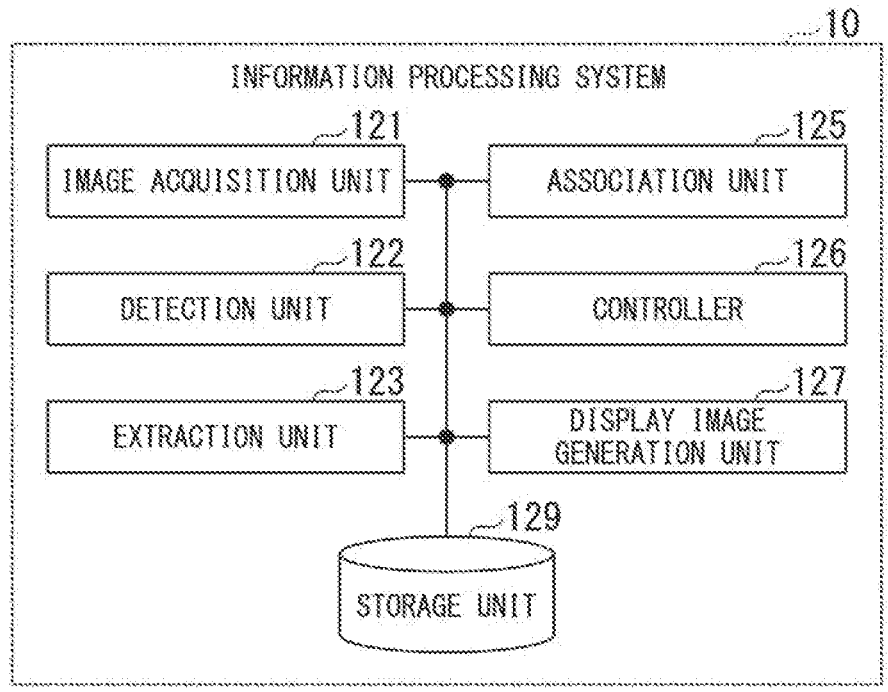
FIG. 2 is a function block diagram of an information processing apparatus 10 according to the embodiment.

FIG. 2 is a functional block diagram of an information processing apparatus 10 according to an example embodiment. The information processing apparatus 10 may be part of the automated gate apparatus 1. According to an embodiment, the information processing apparatus may include one or more processors (such a CPU 102 in FIG. 9 or other processors) and a memory (such as RAM 104 in FIG. 9 or other memories). The information processing apparatus 10 may have an image acquisition unit 121, a detection unit 122, an extraction unit 123, association unit 125, a controller 126, a display image generation unit 127 and a storage unit 129. According to an embodiment, the CPU 102 may execute one or more instructions stored in the memory to implement the various units. The units and the operations performed by the units are provided for illustration, but the disclosure is not limited to the units or the operations performed by the units. According to other embodiments, the novel features of the disclosure may be performed by various combinations of units, including units described above and other units.

Figure 9:
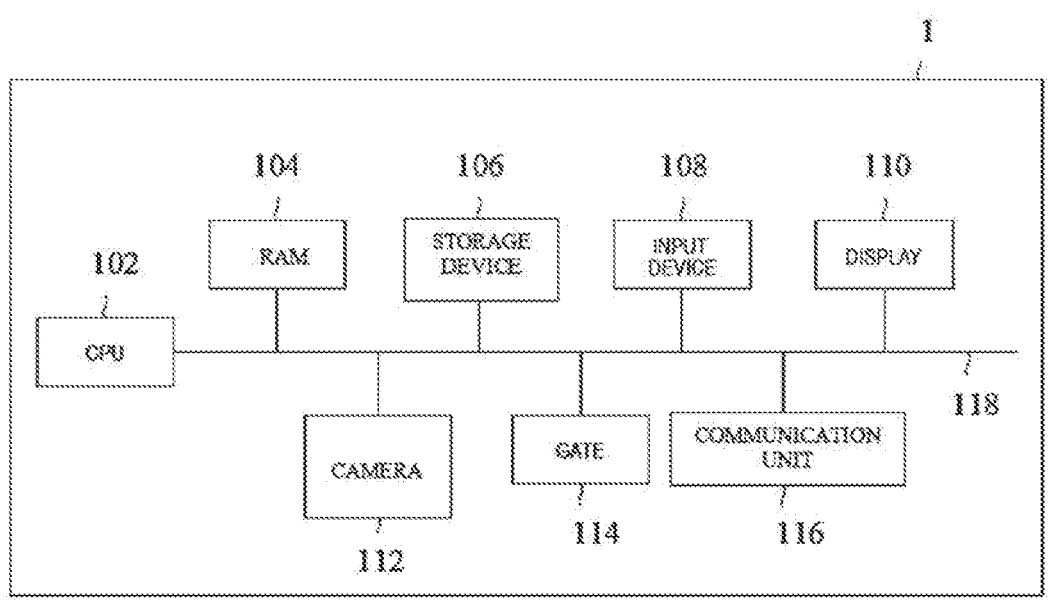
FIG. 9 is a block diagram illustrating an example of a hardware configuration of a gate control apparatus 1 according to an example embodiment.

According to an embodiment, the image acquisition unit 121 may obtain an image from a camera 4, the detection unit 122 may detect a person in the image obtained from camera 4, the extraction unit 123 may extract a feature, such as a facial feature and a body feature, in the image, the association unit 125 may associate the extracted facial feature and the body feature with each other, a controller 126 may control a gate 2 to be opened or closed, the display image generation unit 127 may generate information to be displayed on a display 110 (as shown in FIG. 9) and the storage unit 129 may store information.

Figure 3:
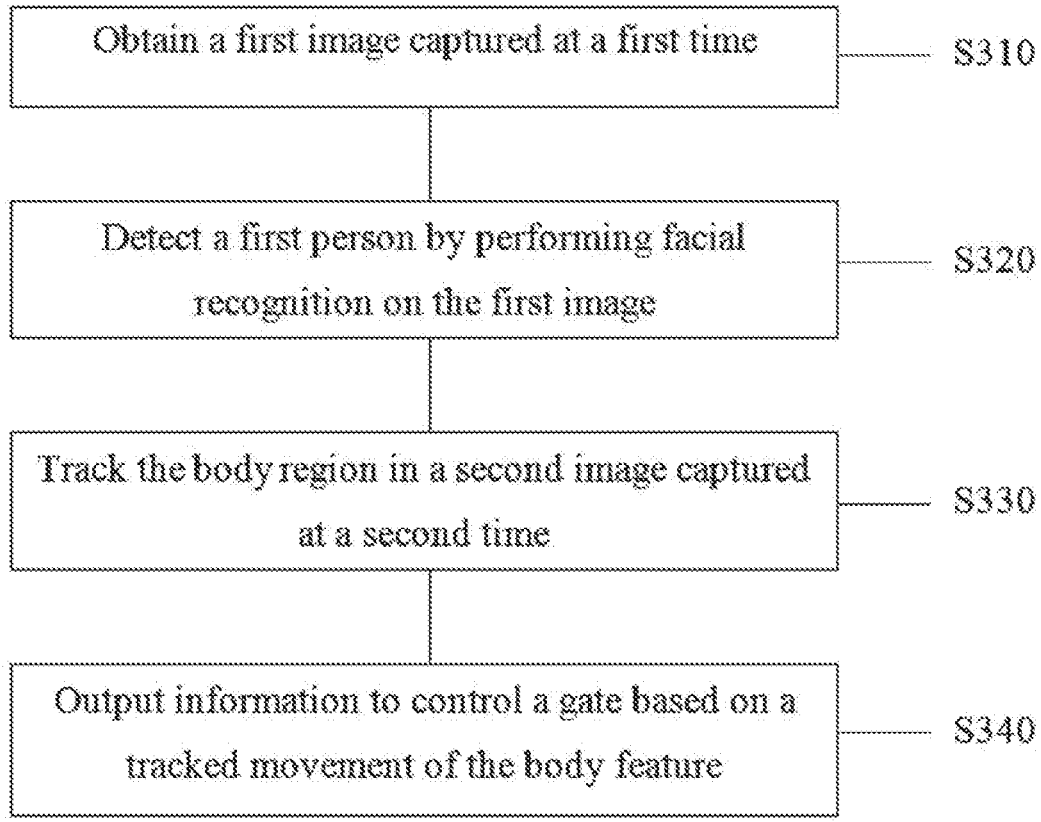
FIG. 3 is a flowchart illustrating an outline of a process performed by the information processing apparatus according to the embodiment.

FIG. 3 is a flowchart illustrating an overview of the process performed by the information processing apparatus 10 according to an example embodiment. With reference to FIGS. 1 and 2, the overview of the process performed by the information processing apparatus 10 will be described along the flowchart of FIG. 3.

Figure 4A:
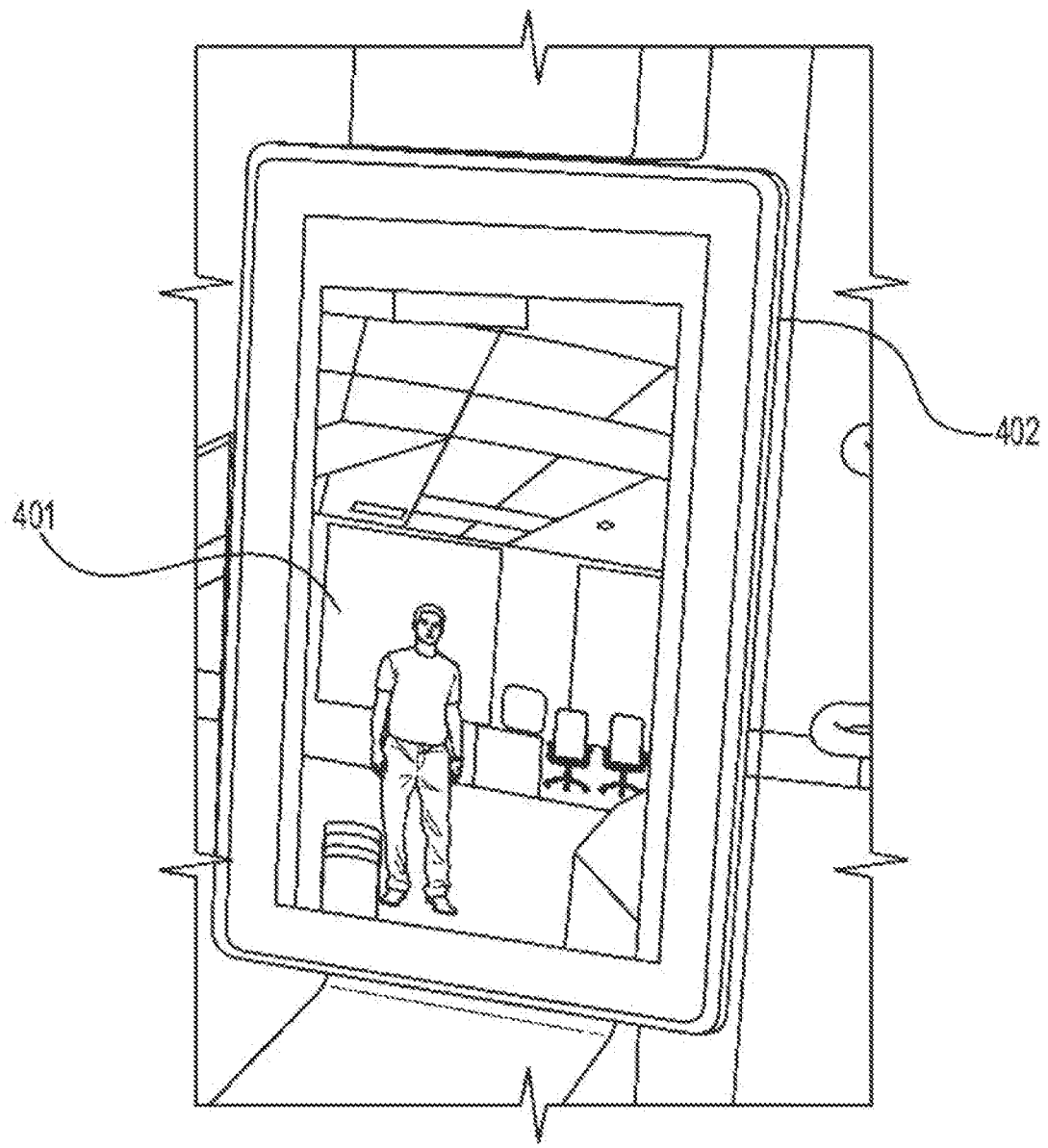
FIG. 4A illustrates an example of the process performed by the information processing apparatus according to the embodiment of FIG. 3.

In S310 of FIG. 3, the information processing apparatus 10 may obtain a first image from the camera 4. According to an embodiment, the method of obtaining the first image may include the following operations performed by the image acquisition unit 121. For instance, the image acquisition unit 121 obtains the first image from the camera 4. This process may correspond to the illustration in FIG. 4A. FIG. 4A shows a first image captured at a first time and stored in the storage unit 129. According to an embodiment, the obtained first image may include a face of a subject to be recognized. The subject may be approaching a gate 1 (shown in FIGS. 1A and 1B). According to another embodiment, the obtained first image may include a plurality of faces, each of the plurality of faces corresponding to a subject, among a plurality of subjects to be recognized. According to an embodiment, the subject to be recognized may be a person.

In S320 of FIG. 3, the information processing apparatus 10 detects a person in the first image. This process corresponds to the illustration in FIG. 4B. According to an embodiment, the information processing apparatus 10 may detect the person by performing facial recognition on the first image.

The method of performing facial recognition may include the following operations performed by the detection unit 122 and the extraction unit 123. For instance, the extraction unit 123 extracts a facial feature from the first image obtained by the image acquisition unit 121, and the detection unit 122 obtains the facial feature extracted by the extraction unit 123 and detects whether the facial feature matches a registered facial feature, among a plurality of registered facial features. Each of the plurality of registered facial features may correspond to a face of a person, among a plurality of persons previously registered. The registered facial features may be stored in a storage unit 129.

In S330, the information processing apparatus 10 tracks a body region in a second image captured at a second time. This process corresponds to the illustration in FIG. 4C. According to an embodiment, the information processing apparatus 10 may track the body region in the second image by associating a face region in the first image with a body region the first image, and matching the body region in the second image with the body region in the first image.

According to an embodiment, the method of performing body tracking may include the following operations performed by the image acquisition unit 121, the detection unit 122, the extraction unit 123 and the association unit 125. For instance, the extraction unit 123 may extract a body region of a subject in the first image. The operation of extracting the body region may be performed after the detection unit detects a match between the face feature in the first image with a registered face feature. According to another embodiment, the operation of extracting the body region may be performed before the detection unit detects a match between the face feature in the first image with a registered face feature or simultaneously while the detection unit detects a match between the face feature in the first image with a registered face feature.

According to an embodiment, the association unit 125 associates the extracted body region with the face region in the first image. For instance, the association unit 125 determines that the body region corresponds to the face region by analyzing one or more characteristics of the face region and the body region. For instance, when the association unit 125 determines that one or more characteristics of the face region is similar to one or more characteristics of the body region, the association unit 125 may associate the face region with the body region. According to another embodiment, the association unit 125 may determine that the body region corresponds to the face region based on a proximity of the face region to the body region.

Figure 5:
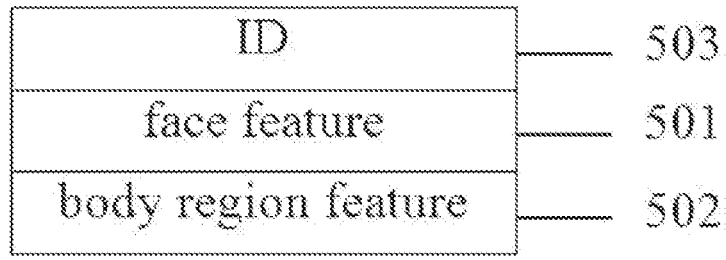
FIG. 5 is an example of a data structure according to another embodiment.

According to an embodiment, the association unit 125 may store the associated face region and body region in a storage unit 129. For instance, as illustrated in FIG. 5, the storage unit 129 may store the face region and the body region in association with identification information of the detected person. The associated face region and body region may be temporarily stored in the storage unit 129.

According to an embodiment, the image acquisition unit 121 may obtain a second image captured by the camera 4 at a second time. The second time being different from the first time. According to an embodiment, the second time is after the first time. According to an embodiment, the second image may be captured by an image acquisition device, such as a camera, that is different from the camera capturing the first image.

According to an embodiment, the extraction unit 123 may extract a feature of the body region in the second image, and the detection unit 122 may obtain the feature of the body region in the second image from the extraction unit 123 and detect whether the feature of the body region in the second image matches a feature of body region stored in the storage unit 129. Accordingly, when there is a match between the body region in the second image and the body region obtained from the storage unit 129, the detection unit 122 may obtain the identification of the subject previously detected in the first image. Accordingly, the information processing apparatus 10 may track the subject using the body regions extracted in the first image and the second image.

According to another embodiment, the information processing apparatus 10 may perform the body tracking operation when a face feature in the second image is unable to be detected. This process may correspond to the illustration in FIG. 4D. For instance, the extraction unit 123 may extract a face feature in the second image and the detection unit 122 may obtain the face feature in the second image from the extraction unit 123 and determine that the face feature does not have sufficient information to perform face recognition. For instance, if the person approaching the camera is not facing the camera, the detection unit 122 may determine that sufficient face feature could not be extracted from the face of the person. According to an embodiment, the detection unit 122 may determine that there is insufficient information for face detection if the face of the person is turned more than 45 degrees away from the camera.

In S340, the information processing apparatus 10 may output information to control the gate 2 based on tracked movement of the body region. This process may correspond to the illustration in FIGS. 1A and 1B. According to an embodiment, the method of controlling the gate may be performed by a controller 126. For instance, the controller 126 may obtain information from the detection unit 122 indicating whether or not there is a match between the feature of the body region in the second image and the feature of the body region obtained from the storage unit 129. In a case where there is a match, the controller 126 may output a control signal to open the gate 2 as illustrated in FIG. 1A. On the other hand, in a case where there is no match, the controller 126 may maintain the gate 2 at a closed state as illustrated in FIG. 1B.

FIG. 4A-4D illustrate examples of processes performed by the information processing apparatus according to the embodiment. In FIG. 4A, the information processing device 1 obtains an image 401. According to an embodiment, the obtained image may be displayed on a display 402.

Figure 4B:
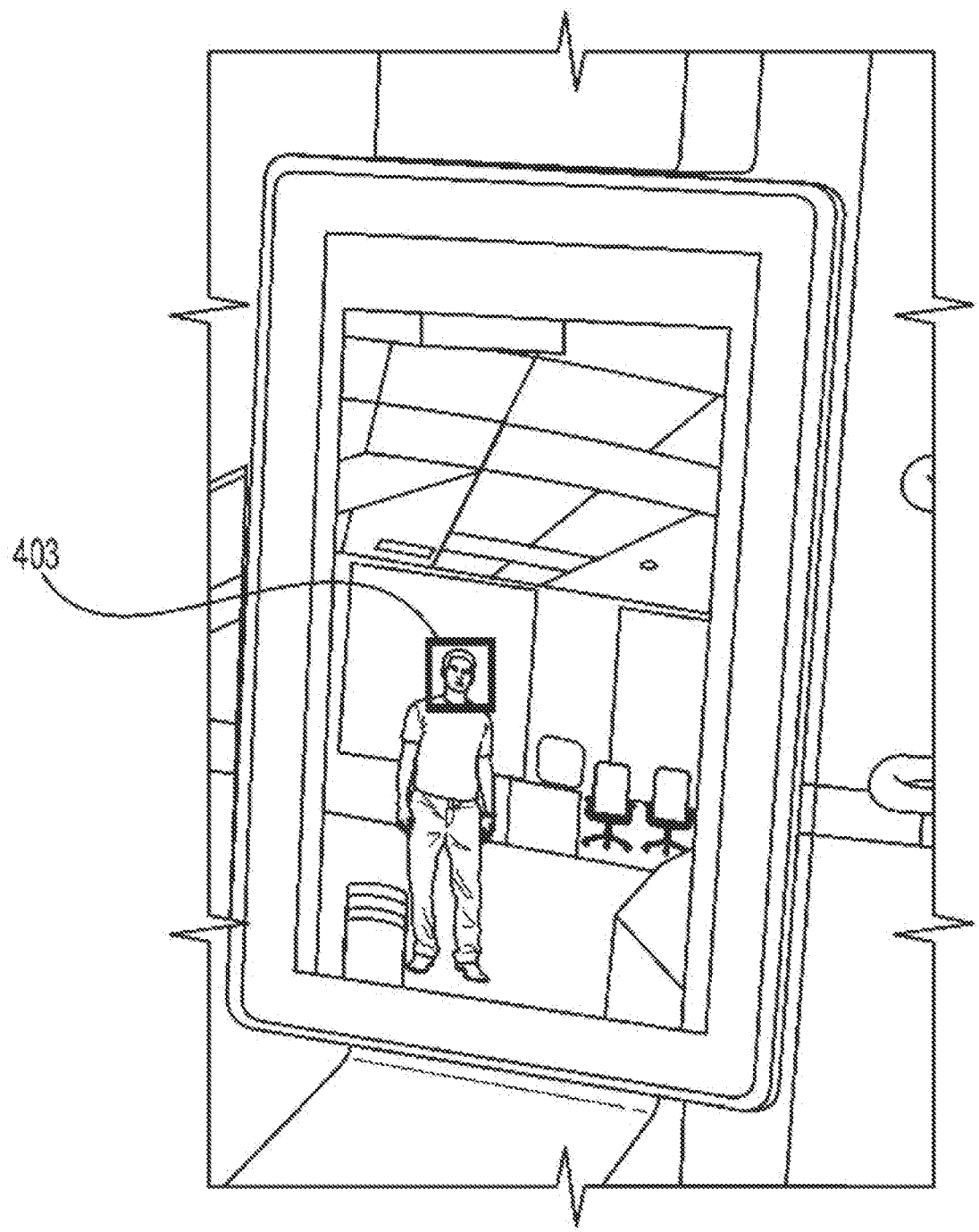
FIG. 4B illustrates an example of the process performed by the information processing apparatus according to the embodiment of FIG. 3.

In FIG. 4B, the information processing apparatus 10 may detect a person in the first image. According to an embodiment, the information processing apparatus 10 may detect the person by performing facial recognition on the first image. For instance, the information processing apparatus may extract a facial feature of a face region 403 in the first image and detect whether the facial feature matches a registered facial feature, among a plurality of registered facial features.

Figure 4C:
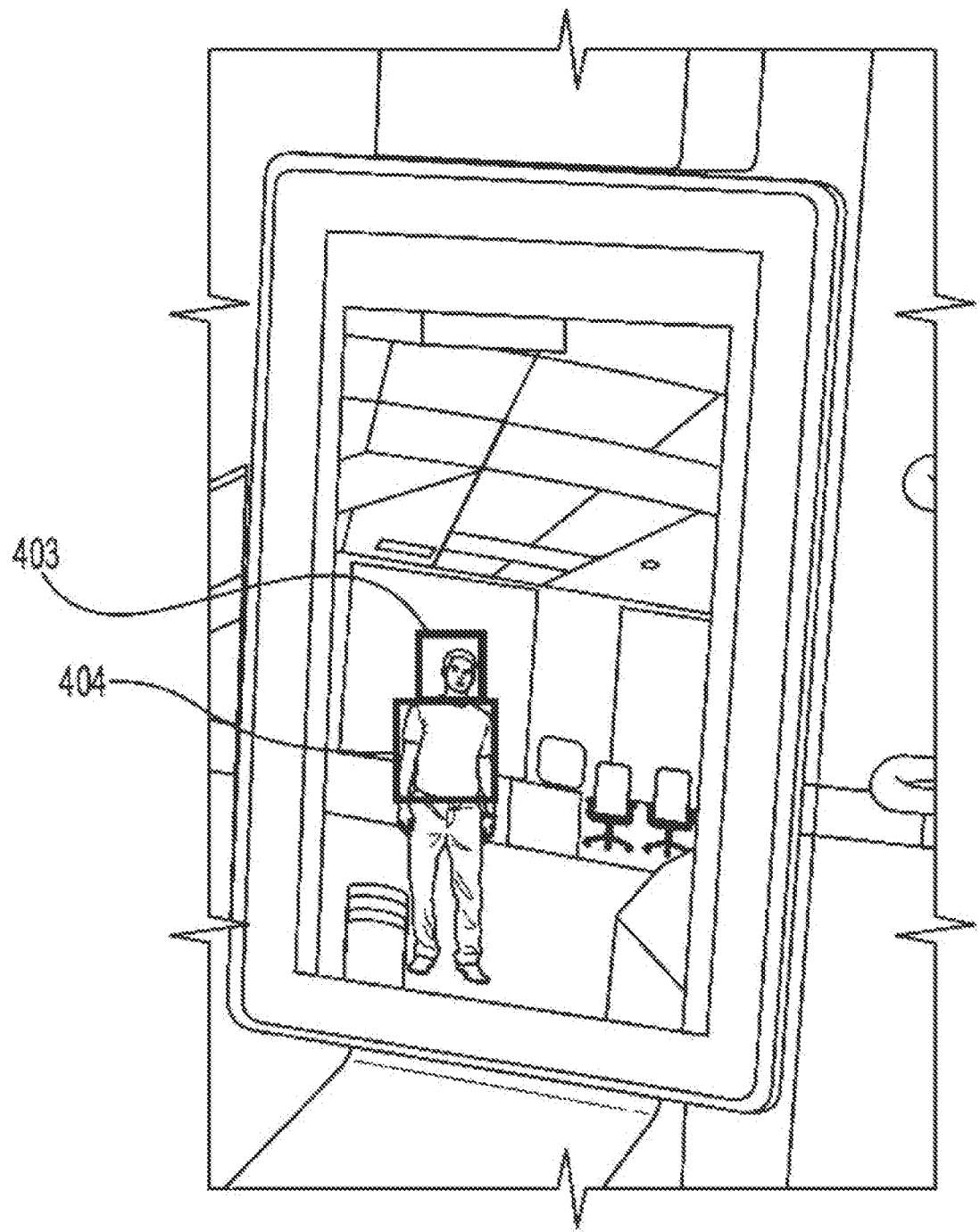
FIG. 4C illustrates an example of the process performed by the information processing apparatus according to the embodiment of FIG. 3.

In FIG. 4C, the information processing apparatus 10 may associate the face region 403 with a body region 404 in the first image. According to an embodiment, the information processing apparatus 10 may store the associated face region 403 and the body region 404 in storage unit 129.

Figure 4D:
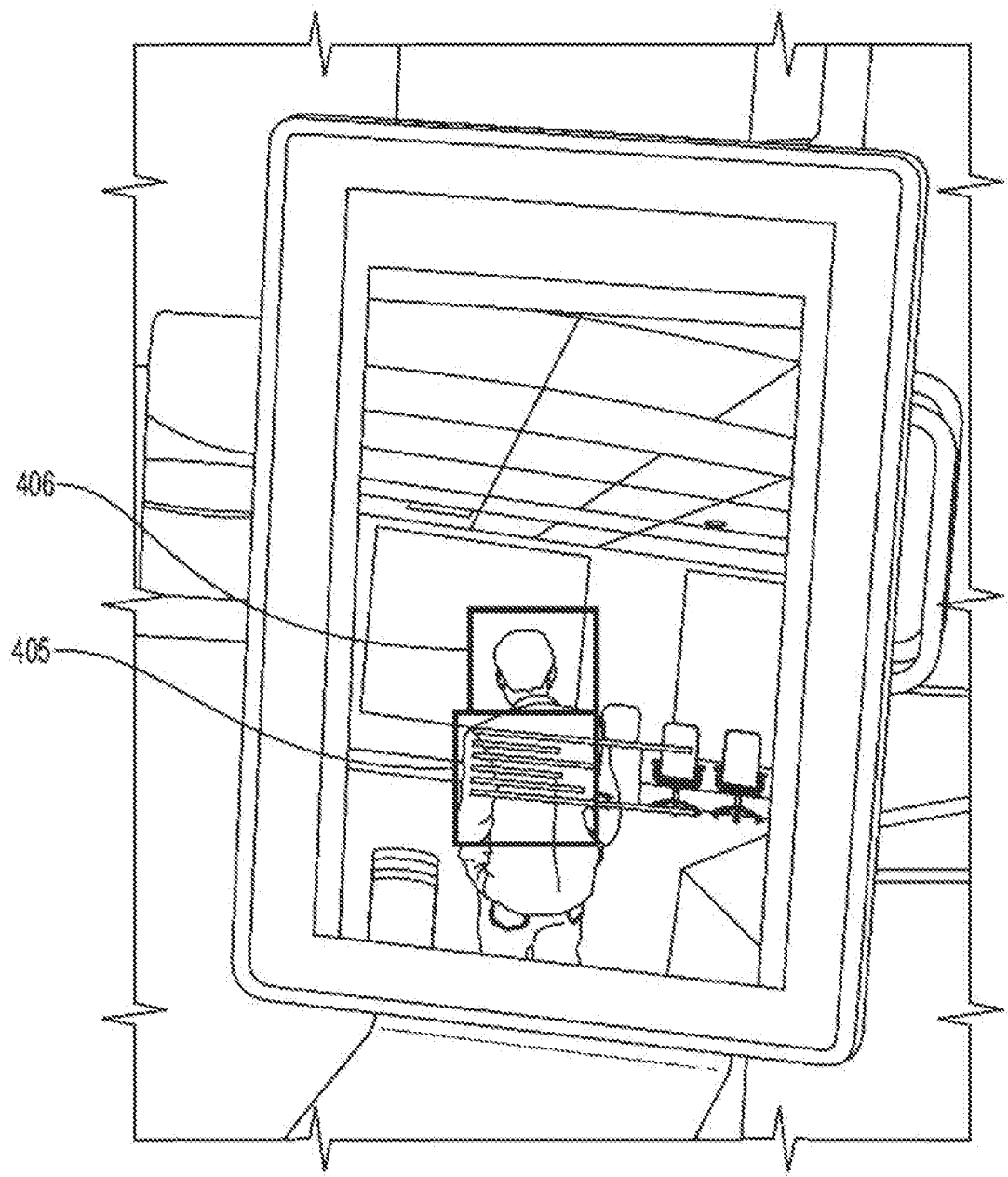
FIG. 4D illustrates an example of the process performed by the information processing apparatus according to the embodiment of FIG. 3.

In FIG. 4D, the information processing apparatus 10 may track a body region 405 in a second image by matching a feature of the body region 405 in the second image with a feature of the body region in the first image, which is stored in storage unit 29. In this manner, the information processing apparatus 10 may perform the body tracking operation even when a face feature 406 in the second image is unable to be detected.

FIG. 5 illustrates a data structure associating face feature information 501 and body features information 502 with each other. For instance, the face feature information 501 and body features information 502 may be associated with each other under an identification information 503 and stored in a storage unit 129. The identification information 503 may be used to further identify if the associated face feature information 501 and body features information 502 correspond to an authenticated person.

Figure 6:
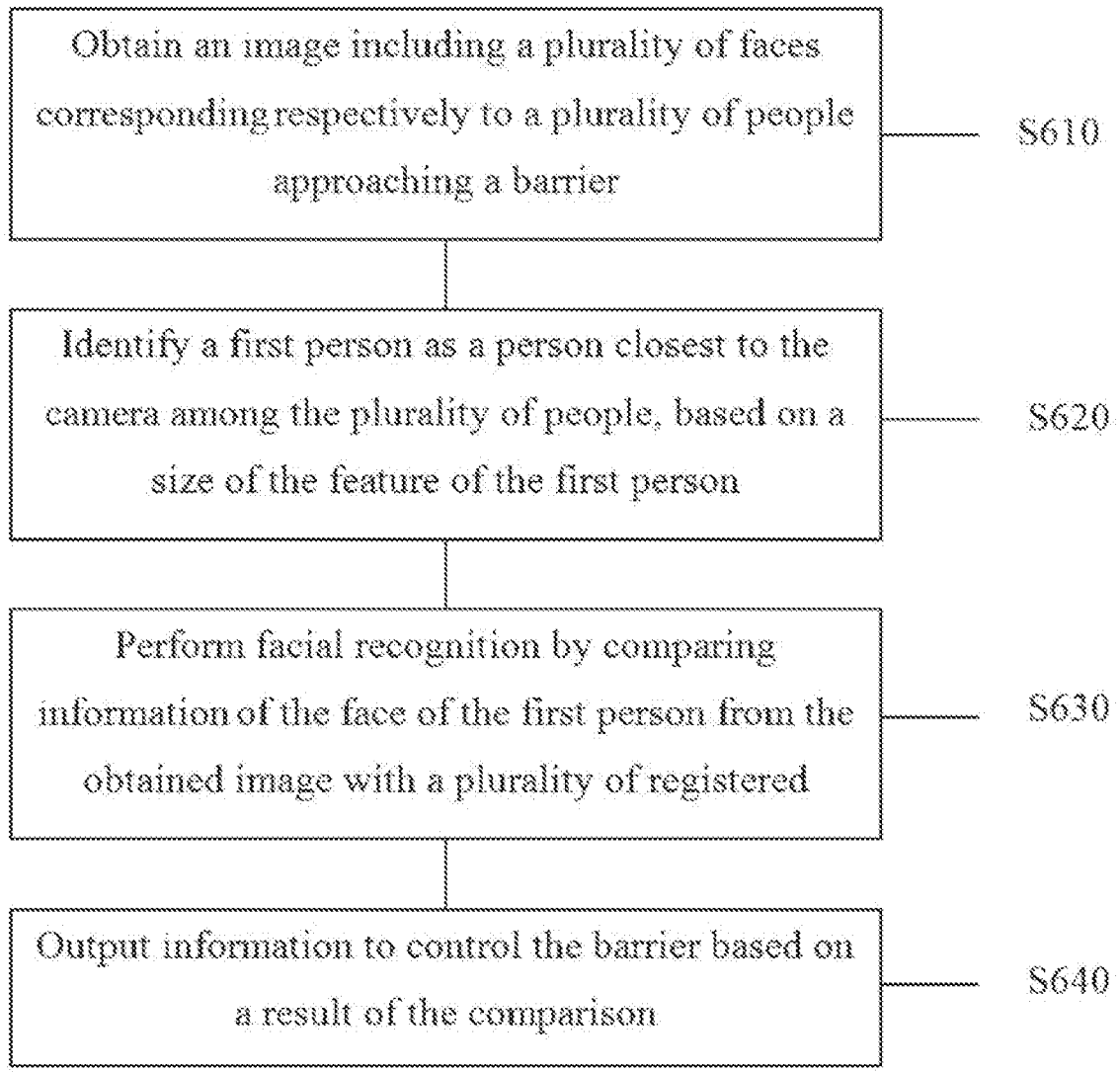
FIG. 6 is a flowchart illustrating a process performed by the information processing apparatus according to yet another embodiment.

FIG. 6 is a flowchart illustrating the outline of the process performed by the information processing apparatus 10 according to another example embodiment. With reference to FIGS. 1 and 2, the outline of the process performed by the information processing apparatus 10 will be described along with the flowchart of FIG. 6.

In S610 of FIG. 6, the information processing apparatus 10 may obtain a first image from a camera 4 (as shown in FIGS. 1A and 1B). According to an embodiment, the method of obtaining the first image may include the following operations performed by the image acquisition unit 121. For instance, the image acquisition unit 121 may obtain the first image from the camera 4. The obtained first image may include a plurality of faces, each of the faces corresponding to a subject, among a plurality of subjects to be recognized. According to an embodiment, the subject to be recognized may be a person.

In S620 of FIG. 6, the information processing apparatus 10 may identify a front person in the first image, that is a person, among a plurality of people, who is closest to the image capturing device. This process may correspond to the illustration in FIGS. 7A and 7B.

According to an embodiment, the method of identifying the front person may include the following operations performed by the detection unit 122 and the extraction unit 123. For instance, the extraction unit 123 may extract a plurality of facial features, each corresponding to one of the plurality of faces in the first image obtained by the image acquisition unit 121. According to an embodiment, the detection unit 122 may obtain the plurality of facial features extracted by the extraction unit 123 and identify a facial feature corresponding to a person closest to the camera. This person closest to the camera may be identified as a front person, among a plurality of persons approaching the camera. According to an embodiment, the detection unit 122 may identify the front person by comparing a size corresponding to each of the plurality of facial features. For instance, the detection unit 122 may compare an area covered by each of the plurality of features and determine a facial feature, among the plurality of features, having the largest area as the facial feature closest to the camera. According to another embodiment, the detection unit 122 may compare a distance between two features points in each of the plurality of facial features and determine a facial feature, among the plurality of features, having the largest distance as the facial feature closest to the camera. For example, the distance may be a distance between two eyes in the facial feature.

In S630, the information processing apparatus 10 may perform facial recognition on the front person by comparing information of the face feature of the front person with a plurality of registered information. According to an embodiment, the method of performing facial recognition may include the following operations performed by the detection unit 122. For instance, the detection unit 122 may obtain the facial feature of the front person extracted by the extraction unit 123 and detect whether the facial feature matches a registered facial feature, among a plurality of registered facial features. Each of the plurality of registered facial features may correspond to a face of a person, among a plurality of persons previously registered. The registered facial features may be stored in a storage device 106.

In S640, the information processing apparatus 10 may output information to control a gate 114 based on a result of the facial recognition. This process may correspond to the illustration in FIGS. 1A and 1B. According to an embodiment, the method of controlling the gate may be performed by a controller 126. For instance, the controller 126 may obtain information from the detection unit 122 indicating whether or not there is a match between the face feature of the front person and the plurality of face features previously registered. In a case where there is a match, the controller 126 may output a control signal to open the gate 2 as illustrated in FIG. 1A. On the other hand, in a case where there is no match, the controller 126 may maintain the gate 2 at a closed state as illustrated in FIG. 1B.

Figure 7A:
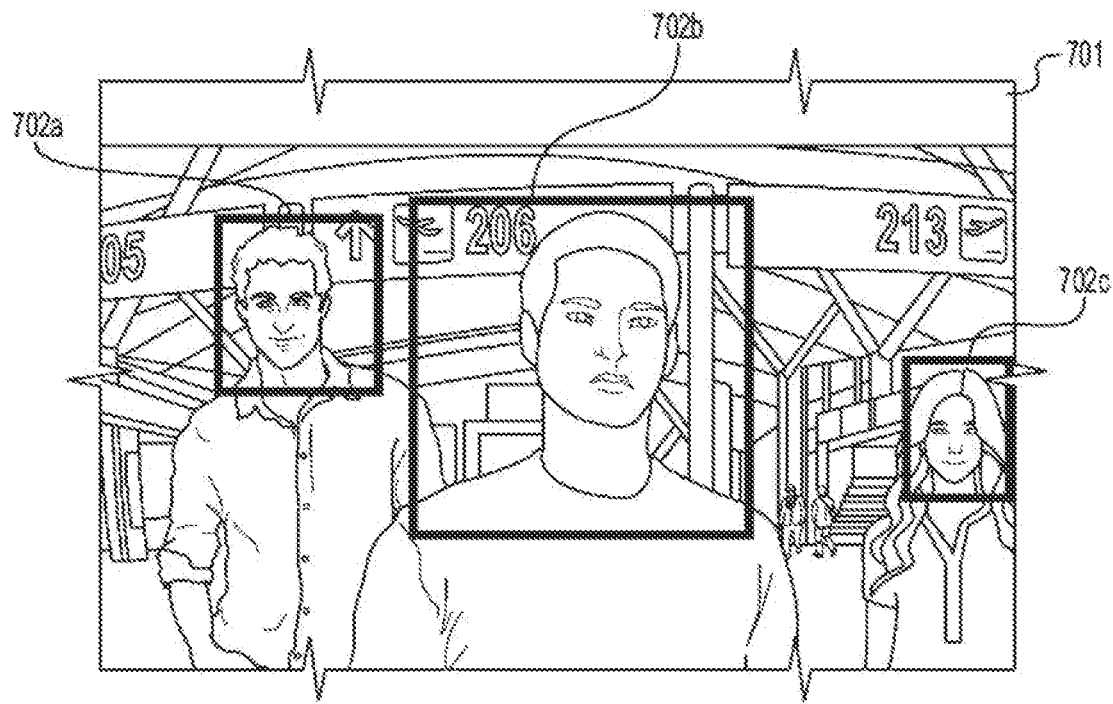
FIG. 7A illustrates an example of the process performed by the information processing apparatus according to the embodiment of FIG. 6.
Figure 7B:
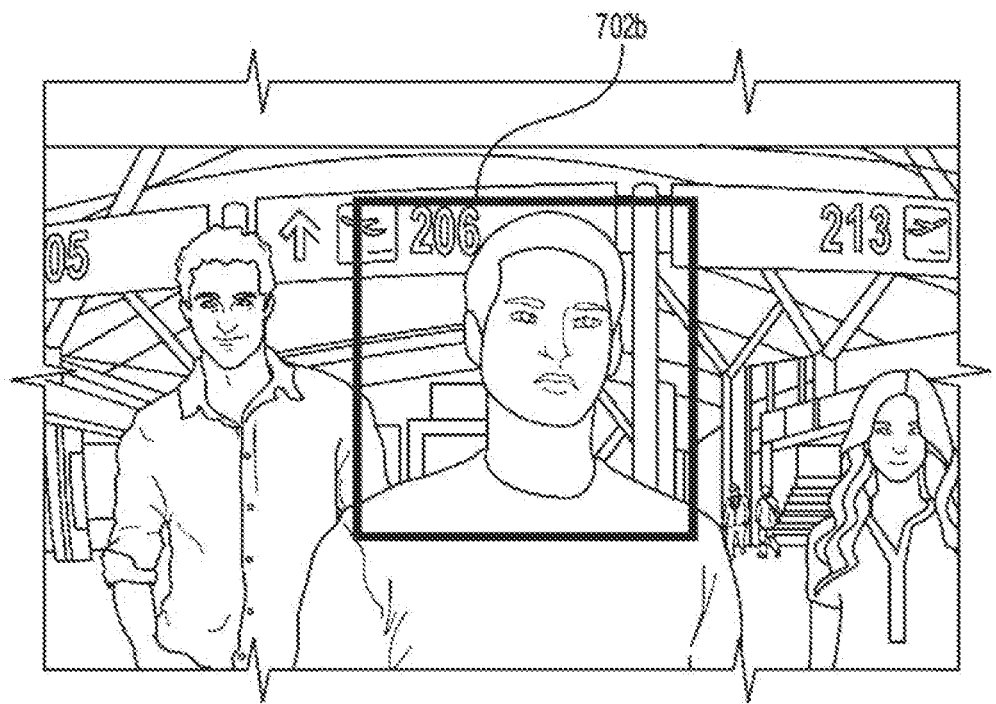
FIG. 7B illustrates an example of the process performed by the information processing apparatus according to the embodiment of FIG. 6.

FIG. 7A-7B illustrate examples of a process performed by the information processing apparatus for identifying the front person according to the embodiment.

In FIG. 7A, the information processing apparatus 10 may obtain an image 701 and extract a plurality of facial features (702a, 702b and 702c), each corresponding to one of the plurality of faces in the image 701. The information processing apparatus 10 may identify the front person by comparing a size of a feature corresponding to each of the plurality of facial features (702a, 702b and 702c). For instance, as illustrated in FIG. 7B, the information processing apparatus 10 may compare an area covered by each of the plurality of facial features and determine a facial feature 702b, among the plurality of features, having the largest area as the facial feature closest to the camera.

Figure 8:
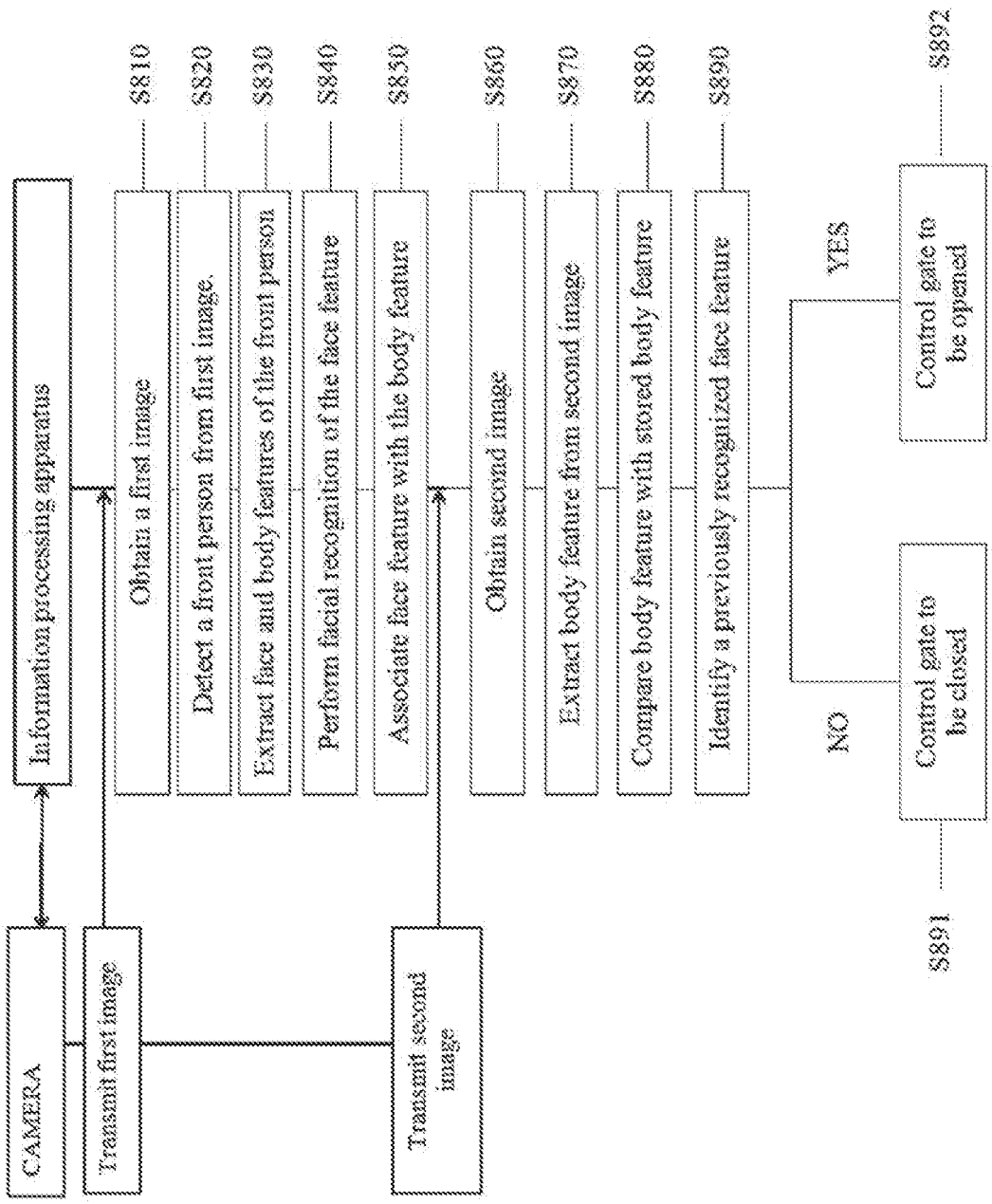
FIG. 8 is a flowchart illustrating the outline of a process performed by the information processing apparatus according to yet another embodiment.

FIG. 8 is a flowchart illustrating the outline of the process performed by the information processing apparatus 10 according to another embodiment. With reference to FIGS. 1 and 2, the outline of the process performed by the information processing apparatus 10 will be described along with the flowchart of FIG. 8.

In S810 of FIG. 8, the information processing apparatus 10 may obtain a first image from a camera 4. According to an embodiment, the image acquisition unit 121 may obtain the first image from the camera 4. The obtained first image may be captured at a first time and may be stored in the storage unit 129. According to an embodiment, the obtained first image may include a face of a subject to be recognized. The subject may be approaching a gate 2. According to another embodiment, the obtained first image may include a plurality of faces, each of the faces corresponding to a subject, among a plurality of subjects to be recognized. According to an embodiment, the subject to be recognized may be a person.

In S820 of FIG. 8, the information processing apparatus 10 may identify a front person in the first image. According to an embodiment, the detection unit 122 may extract a plurality of facial regions, each corresponding to one of the plurality of faces in the first image obtained by the image acquisition unit 121. According to an embodiment, the detection unit 122 may obtain the plurality of facial regions extracted by the extraction unit 123 and identify a facial region corresponding to a person closest to the camera. This person closest to the camera may be identified as a front person, among a plurality of persons approaching the camera. According to an embodiment, the detection unit 122 may identify the front person by comparing a size corresponding to each of the plurality of facial regions. For instance, the detection unit 122 may compare an area covered by each of the plurality of facial regions and determine a facial region, among the plurality of regions, having the largest area as the facial region closest to the camera. According to another embodiment, the detection unit 122 may compare a distance between two feature points in each of the plurality of facial regions and determine a facial region, among the plurality of regions, having the largest distance as the facial region closest to the camera. For example, the distance may be a distance between two eyes in the facial region.

In S830 of FIG. 8, the information processing apparatus 10 may extract a facial feature and a body feature of the front person in the first image. According to another embodiment, the information processing apparatus 10 may extract a facial feature and a body feature for each of the plurality of from the first image.

In S840 of FIG. 8, the information processing apparatus 10 may perform facial recognition on the face feature of the front person. For instance, the extraction unit 123 may extract a facial feature of the front person in the first image obtained and the detection unit 122 may obtain the facial feature extracted by the extraction unit 123 and detect whether the facial feature matches a registered facial feature, among a plurality of registered facial features. Each of the plurality of registered facial features may correspond to a face of a person, among a plurality of persons previously registered. The registered facial features may be stored in a storage device 106.

In S850 of FIG. 8, the information processing apparatus 10 may extract a body feature of the front person in the first image and associate the face feature with the body feature. According to an embodiment, the operation of extracting the body feature may be performed after the facial recognition operation in S840. According to another embodiment, the operation of extracting the body feature may be performed before the detection unit detects a match between the face feature in the first image with a registered face feature or simultaneously while the detection unit detects a match between the face feature in the first image with a registered face feature.

According to an embodiment, the association unit 125 may associate the extracted body feature with the face feature in the first image. For instance, the association unit 125 may determine that the body feature corresponds to the face feature by analyzing one or more characteristics of the face feature and the body feature. For instance, when the association unit 125 determines that one or more characteristics of the face feature is similar to one or more characteristics of the body feature face feature the body feature, the association unit 125 may associate the face feature with the body feature. According to another embodiment, the association unit 125 may determine that the body feature corresponds to the face feature based on a proximity of the face feature to the body feature.

According to an embodiment, the association unit may store the associated face feature and body feature in a storage unit 129. For instance, as illustrated in FIG. 5, the storage unit 129 may store the face feature and the body feature with an identification information of the detected person. According to an embodiment, the associated face feature and body feature may be temporarily stored in the storage unit 129.

In S860 of FIG. 8, the information processing apparatus 10 may obtain a second image. According to an embodiment, the image acquisition unit 121 may obtain a second image captured by a camera 4 at a second time. The second time being different from the first time. According to an embodiment, the second time is after the first time. According to an embodiment, the second image may be captured by a camera different from the camera capturing the first image. According to another embodiment, the obtained first image may include a plurality of faces, each of the faces corresponding to a subject, among a plurality of subjects to be recognized. According to an embodiment, the subject to be recognized may be a person.

In S870 of FIG. 8, the information processing apparatus 10 may extract a body feature from the second image. According to an embodiment, the extraction unit 123 may extract a body feature in the second image, and the detection unit 122 may obtain the body feature in the second image from the extraction unit 123.

In S880 of FIG. 8, the information processing apparatus 10 may compare the extracted body feature from the second image with a body feature stored in storage unit 129. According to an embodiment, the detection unit 122 may compare the body feature in the second image with the body feature stored in the storage unit 129.

In S890 of FIG. 8, the information processing apparatus 10 may identify a previously recognized face feature based on a results of the comparison in S880. According to an embodiment, when there is a match between the body feature in the second image and the body feature obtained from the storage unit 129, the detection unit 122 may obtain the identification of the subject previously recognized in the first image. Accordingly, the information processing apparatus 10 may identify a previously recognized face feature. On the other hand, when there is no match between the body feature in the second image and any of the body features obtained from the storage unit 129, the detection unit 122 may determine that the body feature in the second image does not correspond to a previously recognized face feature in the first image.

In S891 of FIG. 8, the information processing apparatus 10 may control a gate 114 to be opened when a previously recognized face feature is identified in S890. According to an embodiment, the controller 126 may obtain information from the detection unit 122 indicating whether or not there is a match between the body feature in the second image and the body feature obtained from the storage unit 129. In a case where there is a match, the controller 126 may output a control signal to open the gate 2.

In S892 of FIG. 8, the information processing apparatus 10 may allow the gate 2 to be closed when a previously recognized face feature is not identified in S890. According to an embodiment, in a case when there is no match between the body feature in the second image and any of the body features obtained from the storage unit 129, the controller 126 may maintain the gate 2 at a closed state.

FIG. 9 is a block diagram illustrating one example of the hardware configuration of the automated gate apparatus 1. The automated gate apparatus 1 is an apparatus that is capable of automatically performing facial recognition on a person approaching a gate and allowing the person to walk through without requiring the person to stop for authentication even when the person is not always facing the camera while approaching the gate.

As illustrated in FIG. 9, the automated gate apparatus 1 has a CPU 102, a RAM 104, a storage device 106, an input device 108, a display 110, a camera 112, a gate 114, and a communication unit 116. The CPU 102, the RAM 104, the storage device 106, the input device 108, the display 110, the camera 112, the gate 114, and the communication unit 116 are connected to a bus line 118.

The CPU 102 may function as a control unit that operates by executing a program stored in the storage device 106 and controls the operation of the entire automated gate apparatus 1. Further, the CPU 102 may execute an application program stored in the storage device 106 to perform various processes as the automated gate apparatus 1. The RAM 104 may provide a memory field necessary for the operation of the CPU 102.

The storage device 106 may be formed of a storage medium such as a non-volatile memory, a hard disk drive, or the like and functions as a storage unit. The storage device 106 may store a program executed by the CPU 102, data referenced by the CPU 102 when the program is executed, or the like.

The input device 108 may be a touchscreen embedded in the display 110, for example. The input device 108 may function as an input unit that accepts input from a user.

The display 110 may function as a display unit that displays various windows to a user using the automated gate apparatus. For example, the display 110 may display a guidance window showing how to use the automated gate apparatus 1, a notification window to the user, or the like.

The camera 112 may capture an image of a person or a plurality of persons. The image may include a face region and a body region of the person or persons. For example, the camera 112 may be a digital camera that captures a front area of the automated gate apparatus 1 and, when detecting a face of the user standing in front of the automated gate apparatus 1 in an image captured continuously or periodically, captures the face of the user 1 and acquires the face image thereof.

According to an embodiment, when identity verification of the person is successful in the automated gate apparatus 1, the gate 114 changes from a closed state for a standby mode to block passage of the person to an opened state to permit the person to pass through the passage. The scheme of the gate 114 is not particularly limited and may be, for example, a flapper gate in which one or more flappers provided on one side or both side of the passage are opened or closed, a turn-style gate in which three bars are revolved, or the like.

The communication unit 116 may be connected to a network and may transmit and receive data via the network. The communication unit 116 communicates with a server or the like under the control of the CPU 102.

The disclosure is not limited to the example embodiments described above but can be changed as appropriate within a range not departing from the spirit of the disclosure.

While the information processing apparatus and systems used in facial recognition for gate control have been illustrated as examples in each of the above example embodiments, the disclosure is also applicable to areas of facial recognition and body tracking other than gate control by appropriately changing the configuration of the one or more example embodiments.

The scope of one or more example embodiments also includes a processing method of storing, in a storage medium, a program that causes the configuration of the example embodiment to operate to implement the function of the example embodiment described above, reading out as a code the program stored in the storage medium, and executing the code in a computer. That is, a computer readable storage medium is also included in the scope of each example embodiment. Further, not only the storage medium in which the program described above is stored but also the program itself is included in each example embodiment. Further, one or more components included in the example embodiments described above may be a circuit such as an Application Specific Integrated Circuit (ASIC), a Field Programmable Gate Array (FPGA), or the like configured to implement the function of each component.

As the storage medium, for example, a floppy (registered trademark) disk, a hard disk, an optical disk, a magneto-optical disk, a Compact Disk (CD)-ROM, a magnetic tape, a nonvolatile memory card, or a ROM can be used. Further, the scope of each of the example embodiments includes an example that operates on Operating System (OS) to perform a process in cooperation with another software or a function of an add-in board without being limited to an example that performs a process by an individual program stored in the storage medium.

The service implemented by the function of one or more example embodiments described above can be provided to the user in a form of Software as a Service (SaaS).

Note that all the example embodiments described above are mere examples of embodiments in implementing the disclosure, and the technical scope of the disclosure should not be construed in a limiting sense by these example embodiments. That is, the disclosure can be implemented in various forms without departing from the technical concept thereof or the primary feature thereof.

The example embodiments described above may also be described entirely or in part by the following supplementary notes, without being limited to the following.

(Supplementary Note 1)

An apparatus comprising:
a memory storing one or more instructions; and
a processor configured to execute the one or more instructions to:
  obtain a first image including one or more faces captured at a first time by one or more cameras, each of the one or more faces corresponding to a person, among one or more persons;
  detect a first person, among the one or more persons, by performing facial recognition operation on the one or more faces in the image obtained from the camera;
  detect a body region corresponding to a face region of the first person;
  track the body region in a second image captured by the one or more cameras at a second time subsequent to the first time; and
  output information to control a barrier to open based on a determination that the body region is approaching the barrier.

(Supplementary Note 2)

The apparatus of supplementary note 1, wherein the performing facial recognition operation comprises:
  extracting a facial feature corresponding to the one or more faces from the first image; and
  detect whether the facial feature matches a registered facial feature, among a plurality of registered facial features.

(Supplementary Note 3)

The apparatus of supplementary note 1, wherein the tracking the body region in the second image comprises:
  associating the face region in the first image with a body region in the first image; and
  matching the body region in the second image with the body region in the first image.

(Supplementary Note 4)

The apparatus of supplementary note 1, wherein the outputting information to control the barrier comprises:
  outputting a control signal to open the gate based on a match between a feature of the body region in the second image and a feature of a body region, among a plurality of body regions stored in a storage.

(Supplementary Note 5)

The apparatus of supplementary note 4, wherein each of the plurality of body region is previously associated with a respective face region from one or more previously capture images.

(Supplementary Note 6)

The apparatus of supplementary note 1, wherein the one or more faces comprises a plurality of faces captured at the first time by the one or more cameras, the plurality of faces corresponding, respectively, to a plurality of people.

(Supplementary Note 7)

The apparatus of supplementary note 1, wherein the body region is detected after the first person is detected through facial recognition.

(Supplementary Note 8)

The apparatus of supplementary note 1, wherein the body region is detected before the first person is detected through facial recognition.

(Supplementary Note 9)

The apparatus of supplementary note 1, wherein the body region is detected at the same time the first person is detected through facial recognition.

(Supplementary Note 10)

An Apparatus Comprising:
  a memory storing one or more instructions; and
  a processor configured to execute the one or more instructions to:
    obtain an image captured by a camera, the image including a plurality of faces corresponding respectively to a plurality of people approaching a barrier, each of the plurality of faces comprising a feature;
    detect a first person as a person closest to the camera among the plurality of people, based on a size of the feature for the first person; and
    output information to control the barrier based on a result of comparing information of the face of the first person from the obtained image with a plurality of registered information, each of the plurality of registered identification information corresponding to a person registered prior to obtaining the image.

(Supplementary Note 11)

The apparatus of supplementary note 10, wherein the size of the feature corresponds to an area of a face region.

(Supplementary Note 12)

The apparatus of supplementary note 10, wherein the size of the feature corresponds to an eye distance.

(Supplementary Note 13)

A method comprising:
  obtaining a first image including one or more faces captured at a first time by one or more cameras, each of the one or more faces corresponding to a person, among one or more persons;
  detecting a first person, among the one or more persons, by performing facial recognition operation on the one or more faces in the image obtained from the camera;
  detecting a body region corresponding to a face region of the first person;
  tracking the body region in a second image captured by the one or more cameras at a second time subsequent to the first time; and
  outputting information to control a barrier to open based on a determination that the body region is approaching the barrier.

(Supplementary Note 14)

A program causing a computer to execute:
  obtaining a first image including one or more faces captured at a first time by one or more cameras, each of the one or more faces corresponding to a person, among one or more persons;
  detecting a first person, among the one or more persons, by performing facial recognition operation on the one or more faces in the image obtained from the camera;
  detecting a body region corresponding to a face region of the first person;
  tracking the body region in a second image captured by the one or more cameras at a second time subsequent to the first time; and
  outputting information to control a barrier to open based on a determination that the body region is approaching the barrier.

(Supplementary Note 15)

A method comprising:
  obtaining an image captured by a camera, the image including a plurality of faces corresponding respectively to a plurality of people approaching a barrier, each of the plurality of faces comprising a feature;
  detecting a first person as a person closest to the camera among the plurality of people, based on a size of the feature for the first person; and
  outputting information to control the barrier based on a result of comparing information of the face of the first person from the obtained image with a plurality of registered information, each of the plurality of registered identification information corresponding to a person registered prior to obtaining the image.

(Supplementary Note 16)

A program causing a computer to execute:
  obtaining an image captured by a camera, the image including a plurality of faces corresponding respectively to a plurality of people approaching a barrier, each of the plurality of faces comprising a feature;
  detecting a first person as a person closest to the camera among the plurality of people, based on a size of the feature for the first person; and
  outputting information to control the barrier based on a result of comparing information of the face of the first person from the obtained image with a plurality of registered information, each of the plurality of registered identification information corresponding to a person registered prior to obtaining the image.

This application is based upon and claims the benefit of priority from U.S. provisional patent application No. 62/910,751, filed Oct. 4, 2019, the disclosure of which is incorporated herein in its entirety.

The invention claimed is:

1. An apparatus comprising:
  a memory storing one or more instructions; and
  a processor configured to execute the one or more instructions to:
    obtain a first image including one or more faces captured at a first time by a first camera, each of the one or more faces corresponding to a person, among one or more persons;
    detect a first person that, among the one or more persons, has a face region with a largest area and a largest distance between two feature points of the face region, by performing facial recognition operation on the one or more faces in the first image obtained from the first camera;

associate the face region of the first person in the first image with a body region of the first person in the first image;
store the face region and the body region that are associated with each other;
track a body region in a second image captured by a second camera at a second time subsequent to the first time in a case where a face feature in the second image is unable to be detected, the second camera being different from the first camera;
obtain a feature of the body region in the second image;
determine whether the feature of the body region in the second image matches a feature of the stored body region;
obtain identification information of the first person previously detected in the first image in a case where it is determined that the feature of the body region in the second image matches the feature of the stored body region; and
output information to control a barrier to open based on a determination that the body region in the second image is approaching the barrier.

2. The apparatus of claim 1, wherein the performing facial recognition operation comprises:
extracting a facial feature corresponding to the one or more faces from the first image; and
detect whether the facial feature matches a registered facial feature, among a plurality of registered facial features.

3. The apparatus of claim 1, wherein the one or more faces comprise a plurality of faces captured at the first time by the first camera, the plurality of faces corresponding, respectively, to a plurality of people.

4. The apparatus of claim 1, wherein the processor is configured to execute the one or more instructions to further to detect the body region in the first image after the first person is detected through facial recognition.

5. The apparatus of claim 1, wherein the processor is configured to execute the one or more instructions to further to detect the body region in the first image before the first person is detected through facial recognition.

6. The apparatus of claim 1, wherein the processor is configured to execute the one or more instructions to further to detect the body region in the first image at the same time as the first person is detected through facial recognition.

7. An apparatus comprising:
a memory storing one or more instructions; and
a processor configured to execute the one or more instructions to:
obtain a first image captured at a first time by a first camera, the first image including a plurality of faces corresponding respectively to a plurality of people approaching a barrier, each of the plurality of faces comprising a feature;
detect a first person that, among the plurality of people, has a face region with a largest area and a largest distance between two feature points of the face region, as a person closest to the first camera among the plurality of people, based on a size of the feature for the first person;
associate the face region of the first person in the first image with a body region of the first person in the first image;
store the face region and the body region that are associated with each other;
determine whether a feature of a body region in a second image matches a feature of the stored body region, the second image being captured by a second camera at a second time subsequent to the first time, the second camera being different from the first camera;
track a body region in the second image in a case where a face feature in the second image is unable to be detected;
obtain identification information of the first person previously detected in the first image in a case where it is determined that the feature of the body region in the second image matches the feature of the stored body region; and
output information to control the barrier based the identification information.

8. He apparatus of claim 7, wherein the size of the feature corresponds to an area of the face region.

9. The apparatus of claim 7, wherein the size of the feature corresponds to an eye distance.

10. A method performed by a computer and comprising:
obtaining a first image including one or more faces captured at a first time by a first camera, each of the one or more faces corresponding to a person, among one or more persons;
detecting a first person that, among the one or more persons, has a face region with a largest area and a largest distance between two feature points of the face region, by performing facial recognition operation on the one or more faces in the first image obtained from the first camera;
associating the face region of the first person in the first image with a body region of the first person in the first image;
storing the face region and the body region that are associated with each other;
tracking a body region in a second image captured by a second camera at a second time subsequent to the first time in a case where a face feature in the second image is unable to be detected, the second camera being different from the first camera;
obtaining a feature of the body region in the second image;
determining whether the feature of the body region in the second image matches a feature of the stored body region;
obtaining identification information of the first person previously detected in the first image in a case where it is determined that the feature of the body region in the second image matches the feature of the stored body region; and
outputting information to control a barrier to open based on a determination that the body region in the second image is approaching the barrier.

11. A non-transitory recording medium storing a program causing a computer to execute processing comprising:
obtaining a first image including one or more faces captured at a first time by a first camera, each of the one or more faces corresponding to a person, among one or more persons;
detecting a first person that, among the one or more persons, has a face region with a largest area and a largest distance between two feature points of the face region, by performing facial recognition operation on the one or more faces in the first image obtained from the first camera;
associating the face region of the first person in the first image with a body region of the first person in the first image;

storing the face region and the body region that are associated with each other;

tracking a body region in a second image captured by a second camera at a second time subsequent to the first time in a case where a face feature in the second image is unable to be detected, the second camera being different from the first camera;

obtaining a feature of the body region in the second image;

determining whether the feature of the body region in the second image matches a feature of the stored body region;

obtaining identification information of the first person previously detected in the first image in a case where it is determined that the feature of the body region in the second image matches the feature of the stored body region; and outputting information to control a barrier to open based on a determination that the body region in the second image is approaching the barrier.

12. A method performed by a computer and comprising:

obtaining a first image captured at a first time by a first camera, the first image including a plurality of faces corresponding respectively to a plurality of people approaching a barrier, each of the plurality of faces comprising a feature;

detecting a first person that, among the plurality of people, has a face region with a largest area and a largest distance between two feature points of the face region, as a person closest to the first camera among the plurality of people, based on a size of the feature for the first person;

associating the face region of the first person in the first image with a body region of the first person in the first image;

storing the face region and the body region that are associated with each other;

determining whether a feature of a body region in a second image matches a feature of the stored body region, the second image being captured by a second camera at a second time subsequent to the first time, the second camera being different from the first camera;

tracking a body region in the second image in a case where a face feature in the second image is unable to be detected;

obtaining identification information of the first person previously detected in the first image in a case where it is determined that the feature of the body region in the second image matches the feature of the stored body region; and outputting information to control the barrier based on the identification information.

13. A non-transitory recording medium storing a program causing a computer to execute processing comprising:

obtaining a first image captured at a first time by a first camera, the first image including a plurality of faces corresponding respectively to a plurality of people approaching a barrier, each of the plurality of faces comprising a feature;

detecting a first person that, among the plurality of people, has a face region with a largest area and a largest distance between two feature points of the face region, as a person closest to the first camera among the plurality of people, based on a size of the feature for the first person;

associating the face region of the first person in the first image with a body region of the first person in the first image;

storing the face region and the body region that are associated with each other;

determining whether a feature of a body region in a second image matches a feature of the stored body region, the second image being captured by a second camera at a second time subsequent to the first time, the second camera being different from the first camera;

tracking a body region in the second image in a case where a face feature in the second image is unable to be detected;

obtaining identification information of the first person previously detected in the first image in a case where it is determined that the feature of the body region in the second image matches the feature of the stored body region; and outputting information to control the barrier based on the identification information.

\* \* \* \* \*